United States Patent [19]

Newman et al.

[11] 3,831,766

[45] Aug. 27, 1974

[54] FILTER MEDIA

[75] Inventors: Nicholas S. Newman, West Newton; Robert R. Alexander, Milford; Donald A. Sheldon, Walpole, all of Mass.

[73] Assignee: The Kendall Company, Walpole, Mass.

[22] Filed: Apr. 9, 1973

[21] Appl. No.: 349,118

[52] U.S. Cl. ............................................. 210/508
[51] Int. Cl. ........................................... B01d 39/18
[58] Field of Search................. 210/496, 504, 508

[56] References Cited
UNITED STATES PATENTS

| | | | |
|---|---|---|---|
| 2,433,531 | 12/1947 | Ryan | 210/508 X |
| 2,437,082 | 3/1948 | Davis et al. | 210/508 X |
| 2,834,730 | 5/1958 | Painter et al. | 210/508 X |
| 3,237,776 | 3/1966 | Painter et al. | 210/508 X |
| 3,253,715 | 5/1966 | Painter et al. | 210/504 |
| 3,417,013 | 12/1968 | Roberts | 210/508 X |

*Primary Examiner*—Samih N. Zaharna
*Assistant Examiner*—Richard N. Burks

[57] ABSTRACT

Filter media suitable for use in the filtration of fluids under substantial pressure are derived from nonwoven fabrics comprising a blend of fibers which have a low volumetric wet swelling index and fibers which have a high volumetric wet swelling index.

4 Claims, 2 Drawing Figures

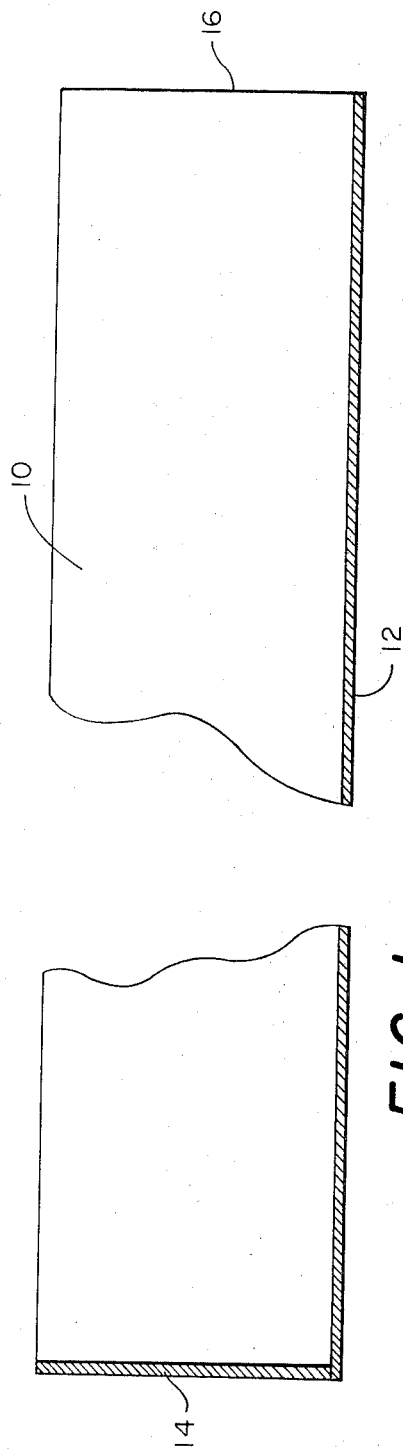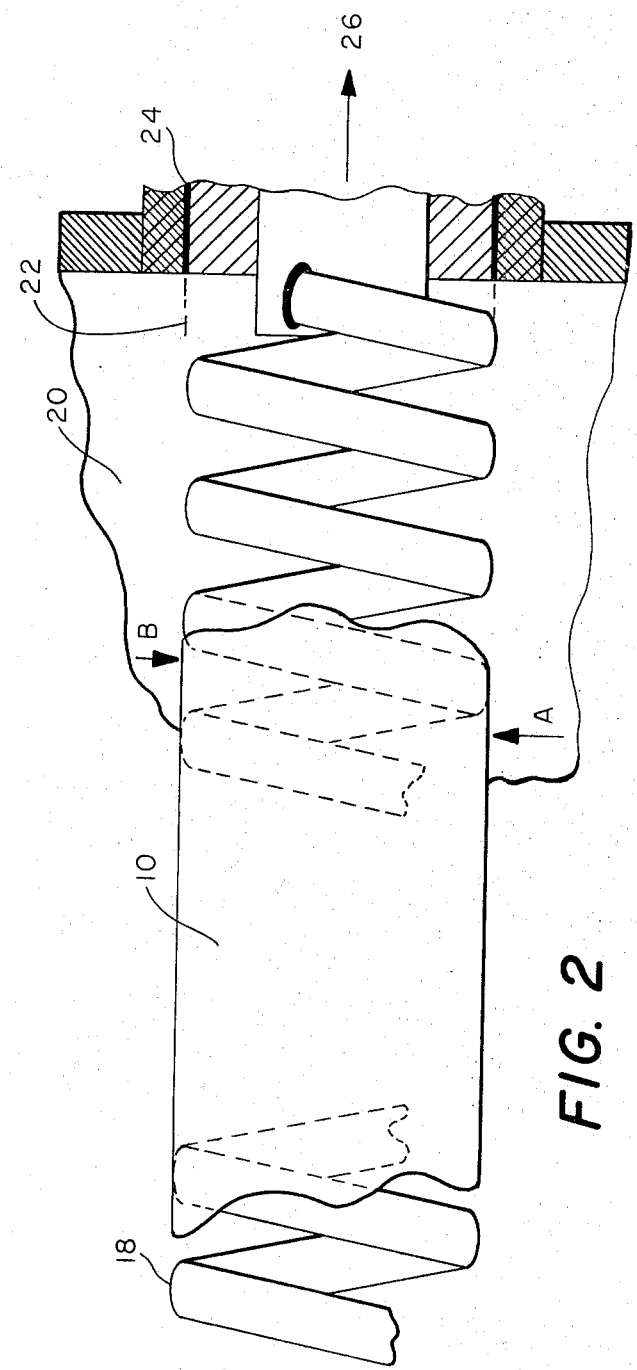

FILTER MEDIA

This invention relates to nonwoven fibrous filter media used for the filtration, under pressure, of fluids containing fine sediment. More particularly, it relates to an improved fiber blend, and an improved distribution of bonding agent, which permit the formation of filter media which function to remove fine sediment when fluids such as sediment-laden milk are filtered therethrough under the substantial pressures met with in the so-called "in line" milking systems.

BACKGROUND OF THE INVENTION

In the processing of aqueous fluids, particularly such fluids as milk and other dairy products, it is customary to perform a preliminary filtration operation close to the source of production, to remove as much as possible of the solid impurities which may serve to contaminate the milk by introducing bacteria. This is in many cases done at the dairy farm, raw milk as it is produced being filtered before the milk is collected in a bulk cooling tank.

The sediment or impurities removed by this process include coarse material such as hair, straw, shavings, etc., down to very finely divided dirt or soil, which varies in amount and in degree of subdivision with the weather and the season. It is customary for milk collected at the farm to be periodically tested for sediment by an inspector or sanitarian, and unless an efficient filtration has been performed, the milk producer is liable to suffer an economic penalty. Efficient removal of fine sediment, therefore, is desirable both for sanitary and economic reasons. Such removal, however, must be effected without unduly prolonging the time required to filter a given quantity of milk.

Historically, milk has for many years been filtered on the farm by a gravity system, wherein a disk of filter medium is fastened into the bottom of a strainer shaped like an inverted dome, perforated in its lower surface. Since the strainers are not more than 10 or 12 inches deep, the hydrostatic pressure on the filter disk rarely exceeds 0.5 pounds per square inch of disk surface.

At an increasing rate, this type of hand-operated milk filtration is being replaced by in-line filtration devices, wherein milk is drawn from the cows by a milking machine, and is transferred to a pipeline system wherein it is forced under pressure through a filtering device, to remove sediment, from whence the filtered milk passes to a bulk cooling or holding tank. The fluid milk is then pumped from the holding tank into a tank truck.

Such in-line installations have become increasingly popular in the dairy industry, due to convenience, improved sanitation, and to the greatly reduced manpower needed.

Filter media designed for gravity strainers, though satisfactorily efficient under the low-pressure conditions encountered therein, are not designed to withstand the pressures encountered in forced-pressure in-line systems, where the pumps which force the milk through the filter element may operate at fluid pressures up to 28 pounds per square inch. Such gravity filter media commonly have wet tensile strengths of from 1 to about 2 pounds per inch-wide strip, and a Mullen burst strength, wet, of about 20 pounds. Particularly when the pores of the media are clogged with fine sediment, the pressures developed in an in-line system will cause rupture of the media, with the release of accumulated sediment. Thus hundreds of gallons of milk may become contaminated by the failure of a single filter unit.

SUMMARY OF THE INVENTION

It is a primary object of this invention to provide a fibrous, nonwoven fluid filter medium which will remove sediment from sediment-contaminated fluids while withstanding fluid pressures of 20 pounds per square inch.

It is a further object of the invention to provide a fluid filter medium comprising a blend of water-swellable cellulosic fibers such as rayon or cotton, together with synthetic fibers of a volumetric swelling in water of less than 3 percent.

An additional object of the invention is to provide a nonwoven filter medium in which the wet tenacity, denier, and wet stiffness of the fibers combine to effect efficient filtration under pressures of 20 pounds per square inch or more.

Other objects of the invention will appear more fully from the following description and drawings, in which:

FIG. 1 is a side elevation, broken away, of a tubular filter made from the filter media of this invention.

FIG. 2 is a side elevation, also broken away, of the filtering section of an in-line filter system, showing the filter tube of FIG. 1 in place.

Referring to FIG. 1, the filter media 10 of this invention, in pressurized in-line systems, are commonly formed into elongated tubes, commonly called "socks", by folding a strip of the nonwoven fabric on itself, and sealing the edges of the lengthwise portion, as at 12, and one end, as at 14, leaving one end, 16, open.

Referring to FIG. 2, the filter sock 10 is shown in place in a representative pressure filter system. Numerous types of such in-line systems are made by various manufacturers: the representation of FIG. 2 is not meant to depict any particular system, but only to convey the working relationship of the elements common to all such systems. No part of the partial system shown in FIG. 2 is claimed as an element of this invention apart from the filter sock 10.

Milk under pressure is pumped into a milking chamber 20, from whence it is forced through the nonwoven filter 10, supported against collapse by being mounted on an open armature 18. Various types of supporting armatures are used, the illustration here being of a semi-rigid metal coil. The milk chamber 20 is totally enclosed, the closed end of the chamber and the sealed end of the sock (14 in FIG. 1) not being shown. Milk passing through the sock 10, as at A and B, passes into the armature, and under pressure is forced out of the exit end 26 of the armature. The open end of the sock (16 in FIG. 1, 22 in FIG. 2) is held tightly into the system by a gasket arrangement 24.

It has been found that in order to obtain the desired balance between fast flow time and acceptable sediment retention under pressurized flow of 20 pounds or more per square inch, a blend of fibers is needed which combines the effect of hydrophophilic, water-swellable fibers with hydrophobic, non-swellable fibers, the latter serving as high-tensile load-bearing fibers.

The hydrophilic fibers, such as cotton or rayon, are readily wet by water or aqueous fluids, of which they absorb susbstantial amounts. Additionally, such fibers swell in aqueous fluids, the volumetric swelling of both cotton and rayon being 50 percent or higher. The modulus of rigidity of such fibers is low when they are wet, and the combination of these factors tends to produce a filter which collapses and sags under pressure, with an undesirable tendency to rupture.

It has now been found that the undesirable tendency of all-cellulosic filter media to collapse and rupture under fluid pressure can be circumvented by forming and bonding an intimate blend of cellulosic fibers with a percentage of hydrophobic fibers having a wet stiffness of at least 8 grams per denier at elongations of between 1 and 10 percent, and a volumetric swelling in water of not more than about 3 percent. By "intimate blend" is meant that both species of fibers are intermingled throughout the length, breadth, and thickness of the filter sheet, and are not stratified in layers of different composition. The theoretical considerations dictating such a choice of fiber are set forth immediately below.

SELECTION OF FIBER BLEND

As a general rule, the finer the fibers in a filter medium, the more efficiently will the filter remove fine sediment. As a practical matter, however, milk filters composed solely of fine denier rayon, of say 1.5 denier, are not commercially acceptable because their speed of filtration is not only initially too slow, but the sediment tends to build up on the surface of the disk, and the filter becomes blocked, with no fluid passing therethrough. This is an intolerable situation on a farm where the speed of filtration of milk must roughly keep pace with the milk production at milking time. Although the filtering ability of a disk of fine rayon fibers is desirable, the slowness of filtration, combined with the low wet strength of rayon, renders the use of such filter socks unfeasible.

In practicing this invention, therefore, it is preferred that between 60 percent and 90 percent of the fiber content be a blend of medium and coarse rayon fibers, as for example of 3.0 and 5.5 denier. Depending on the particular pressures encountered in the pressure system used, and on the sediment conditions encountered, the relative proportions of 3 denier and coarser denier rayon may be varied from a 50—50 blend of each, to a blend of 9 parts 3 denier to 1 part 5.5 denier or coarser.

These fibers are blended with with between 10 percent and 40 percent of a resilient, tough fiber of high wet stiffness formed from a synthetic organic polymer such as a polyamide, polyester, polyolefin, or polyacrylate.

By an organic polymeric fiber of high wet stiffness is meant those fibers which have a stiffness of at least about 8 grams per denier when wet with water, under an elongation of from 1 to 10 percent. The ability to maintain a lofty, porous structure during the pressures encountered in the filtration process is more closely related to wet stiffness under 1 to 10 percent elongation than to the behavior of the fiber when dry. The following table shows the wet stiffness at 1 and 10 percent elongation of fibers which have been found useful in the practice of this invention.

TABLE 1

|  | Elongation | |
| --- | --- | --- |
|  | 1% | 10% |
| Grams per denier: | | |
| Polyester | 28 | 12 |
| Polyamide | 8 | 8 |
| Polypropylene | 40 | 11 |
| Polyacrylate | 47 | 13 |

Such fibers are in contrast to fibers such as rayon (4 grams per denier at 1 percent elongation). The high wet stiffness fibers are generally characterized by a large area under the stress-strain curve, indicating a high index of toughness—that is, an ability to absorb the compressive forces encountered in pressure filtration while still retaining the ability to recover from such compression and to maintain a porous, non-compacting structure capable of efficient performance as a filter.

Since these synthetic fibers have a low index of volumetric swelling when wet, in contrast with the rayon fibers, they may vary in denier from 1.75 to 6 denier, with a blend of 3 and 6 denier preferred. They serve as what may be termed scaffolding fibers, relatively unaffected by moisture, while the cellulosic fibers with which they are intimately blended will swell and to a certain extent collapse together to form a filter sock which will remove sediment from milk or aqueous fluids, but which will withstand the forces encountered in in-line filtration systems.

Filter media produced according to this invention are characterized by high wet strength. When processed from bonded webs weighing from 75 to 100 grams per square yard they have a wet strength, per inch-wide strip, of at least 12 pounds in the machine direction, 8 pounds in the cross direction. The Mullen burst strength, wet, is about 35 pounds. Such media will show sediment retentions of up to 80 percent in the following test.

SEDIMENT TEST METHOD

In testing filter media for filtration efficiency, it is desirable to use a reproducible laboratory test, since the amount and fineness of natural sediment encountered in actual farm filtration will vary widely from day to day. For this purpose a finely divided silicon carbide is used, in a fineness of 280 mesh, which has an average particle size of about 48 microns. Five grams of this silicon carbide are suspended in 5 gallons of water and filtered through a wet-out piece of filter medium mounted in a conventional metal milk strainer. The time necessary to complete the five gallon filtration is recorded, after which the filter, containing retained sediment, is dried and ignited in a muffle furnace. The amount of silicon carbide after ignition, divided by 5, is the percent sediment retained, and is expressed as percent efficiency of sediment removal.

A five gallon filtration of this type has been found to correlate well with standard farm sediment tests, wherein a sample of milk if force-filtered through a small compacted sediment-test disk and the appearance of the sediment-test disk is used as a criterion of the clarity of the milk.

PREPARATION OF FILTER MEDIA

The desired proportions of fibers of different species are blended intimately and passed through a set of carding machines or the like. To attain the desired weight of about 63 grams of fiber per square yard, the output webs from 5 or 6 cards are superimposed and are continuously transported to a conventional saturator, where the composite fleece is saturated with a suitable binding agent. The binding agent is preferably one which may be dispersed or dissolved in water, but which on drying or curing becomes relatively insensitive to water, so that the integrity of the fibrous array is not disturbed during a subsequent filtration. Polyvinyl acetate emulsions containing a cross-linking agent are suitable, as are certain acrylic or modified acrylic binders listed as acceptable for use in milk filters under the U.S. Food Additives Amendment regulation No. 121.2536.

The saturated fleece is then squeezed or vacuum-extracted to control the amount of binder added in the saturation step. It is in this operation that the wet resilience of the fibers blend must be sufficient to overcome the tendency of the fibers to deform permanently into an excessively compact and dense structure which will block or plug up in subsequent filtering operations.

A conventional drying operation, as by passing the saturated fleece over a set of dry cans, may be followed by a heat-curing operation if the particular binder formulation requires such a step.

The amount and distribution of the bonding agent is also important. In general, not more than 30 to 35 percent of the final product is polymeric binder, which is to a considerable extent confined to the crossover points of the blended fibers, avoiding a complete coating of the fibers which would restrict the ability of the cellulosic fibers to swell and perform their sediment-removing function. In processing, filter media of this invention are preferably compacted to a density of between 0.09 and 0.16 grams per cubic centimeter, compared with filter media used in conventional gravity systems wherein the density of the media is substantially below that figure. Such a degree of compaction, combined with high wet strength, produces a filter medium which can withstand over 20 pounds per square inch pressure in in-line filter systems, while maintaining satisfactory flow rates and sediment removal efficiencies.

The invention will be illustrated by the following example.

An intimate blend of 20% 3.5 denier nylon fibers, 40% 3 denier viscose rayon, and 40% 5.5 denier viscose rayon was carded into a set of superimposed fleeces weighing 60 grams per square yard. The fleeces were then bonded by means of a dispersion of an acrylic polymer, and dried. The final dried product weighed 91 grams and consisted of 66 percent fiber, 34 percent binder. It has a wet tensile strength, per inch-wide strip, of 12 pounds in the machine direction, 8 pounds in the cross direction, and a wet Mullen burst strength of 44 pounds. The thickness was 34 mils, indicating a density of 0.127 grams per cubic centimeter.

The flow time in the above-described test was 18 seconds, with 70 percent of the sediment being retained. When fashioned into a filter sock, this filter medium withstood the pressures involved in a heavy duty, high pressure system, in actual farm tests on sediment-laden milk, without rupture or other signs of failure.

Having thus described our invention, we claim:

1. A nonwoven filter medium for the removal of sediment from aqueous fluids which comprises
    a bonded array of intermingled cellulosic fibers and fibers derived from synthetic organic polymers,
    said cellulosic fibers constituting from 60 to 90 percent by weight of the fiber content of said medium, and being of at least 3.0 denier and being highly swelled by water, with a volumetric swelling index of about 50 percent or higher,
    said fibers derived from said synthetic organic polymer constituting from 10 to 40 percent by weight of the fiber content of said medium and having a volumetric swelling index of not over 3 percent.

2. The medium according to claim 1 in which the cellulosic fibers are a blend of 3.0 and 5.5 denier viscose rayon fibers.

3. The medium according to claim 1 characterized by a wet tensile strength of at least 8 pounds per inch-wide strip and a wet Mullen burst strength of at least about 35 pounds.

4. The medium according to claim 1 in which the density of the medium is between 0.09 and 0.16 grams per cubic centimeter.

* * * * *